US011526609B1

(12) United States Patent
Elgaafary et al.

(10) Patent No.: US 11,526,609 B1
(45) Date of Patent: Dec. 13, 2022

(54) SYSTEM AND METHOD FOR RECENT FILE MALWARE SCANNING (71) Applicant: UAB 360 IT, Vilnius (LT)

(72) Inventors: Mohamed Adly Amer Elgaafary, Vilnius (LT); Mantas Briliauskas, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

(21) Appl. No.: 17/529,395

(22) Filed: Nov. 18, 2021

(51) Int. Cl.
*G06F 21/56* (2013.01)
*G06F 16/13* (2019.01)

(52) U.S. Cl.
CPC .......... *G06F 21/565* (2013.01); *G06F 16/137* (2019.01); *G06F 2221/034* (2013.01)

(58) Field of Classification Search
CPC . G06F 21/565; G06F 16/137; G06F 2221/034
See application file for complete search history.

(56) References Cited

U.S. PATENT DOCUMENTS

| 6,366,912 | B1 * | 4/2002 | Wallent | G06F 21/52 726/8 |
| 6,763,466 | B1 * | 7/2004 | Glover | G06F 21/56 713/193 |
| 6,952,776 | B1 * | 10/2005 | Chess | G06F 21/564 707/999.103 |
| 7,188,367 | B1 * | 3/2007 | Edwards | G06F 21/566 713/188 |
| 2003/0126214 | A1 * | 7/2003 | Oliszewski | G06Q 10/10 709/206 |
| 2006/0236398 | A1 * | 10/2006 | Trakic | G06F 21/562 713/188 |
| 2008/0301796 | A1 * | 12/2008 | Holostov | H04L 63/145 726/12 |
| 2015/0180997 | A1 * | 6/2015 | Ramanan | G06F 21/567 709/214 |
| 2019/0034623 | A1 * | 1/2019 | Lowry | G06F 16/1734 |
| 2021/0097569 | A1 * | 4/2021 | Devane | G06F 21/563 |

* cited by examiner

*Primary Examiner* — Robert B Leung
(74) *Attorney, Agent, or Firm* — Moser Taboada (57) ABSTRACT

Systems and methods for recent file malware scanning are provided herein. In some embodiments, a security system may include a processor programmed to download one or more files; filter, by a first driver, the one or more downloaded files using a security zone identifier; scan, by the first driver, the filtered subset of one or more files for malware; store, by a second driver, a first set of information associated with each of the scanned files to indicate that each the filtered subset of one or more files have been scanned, wherein the first set of information is stored as metadata using alternative data stream (ADS) associated with each scanned file; monitor, by the second driver, changes to existing files based on the metadata stored; send instructions to rescan any existing file that has changed for malware; and update the information associated with any rescanned file's metadata using the ADS.

20 Claims, 8 Drawing Sheets

SYSTEM AND METHOD FOR RECENT FILE MALWARE SCANNING

FIELD

The invention relates generally to computer security, and more particularly to identifying security issues in Internet downloaded files.

BACKGROUND

The traditional line of defense against malware is composed of malware detectors such as virus and spyware scanners. The scanners decide if a scanned data file is a threat, based on the data they collect on it. The data may be collected with or without executing the scanned data file. Static analysis is a process of collecting and analyzing data file descriptions (e.g. file format descriptions, code description, binary data, text strings, information extracted via code emulation and other similar data) without actually running (executing) the code. Static analysis is generally performed by determining the signature of the binary file which is a unique identification for the binary file and can be done by calculating the cryptographic hash of the file and understanding each component. It is generally considered that static analysis is safe for the user—the malware can be detected before it starts to act on a real user's machine.

SUMMARY

Systems and methods for recently downloaded Internet files malware scanning are provided herein. In some embodiments, a system includes an input/output device, a storage device, and a processor programmed to download one or more files via the input/output device to the storage device, filter, by a first driver, the one or more downloaded files using a security zone identifier associated with each of the one or more downloaded files to produce a filtered subset of one or more files, scan, by the first driver, the filtered subset of one or more files for malware, store, by a second driver in an alternative data stream (ADS), a first set of information associated with each of the scanned files to indicate that each the filtered subset of one or more files have been scanned, monitor, by a second driver, changes to existing files on the storage device based on a comparison of the information associated with the existing files stored and the information stored associated with the existing files in the alternative data stream file, and send instructions to rescan any existing file that has changed for malware, and update the information associated with any rescanned filed in the alternative data stream file.

In other embodiments, the system includes an input/output device, a storage device, and a processor programmed to receive files via the input/output device to the storage device, detect if any processes are trying to write to other files on the system, and if so, check if the detected file has been scanned before using an alternative-stream database, if the detected file matches the alternative-stream database, the detected file is allowed and noted as clean, if the detected file fails to match the alternative-stream database, the detected file is scanned and marked as scanned until the detected file changes again, re-scan the detected file that changed again using the alternative-stream database, and if the detected file matches the alternative-stream database, the detected file is allowed and noted as clean, and if the detected file fails to match the alternative-stream database, the detected file that changed again is disabled, and transmit the results of the rescan to the input/output device.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

The following detailed description describes techniques (e.g., methods, processes, and systems) for efficiently security scanning recently downloaded files from the Internet into a computer system. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims.

Embodiments consistent with the invention use a solution that works with recently downloaded files from the Internet as the recently downloaded files are the most likely sources of malware. Such a system is more efficient when compared to traditional static analysis systems that scan all downloaded files thereby using a large number of computational resources, and the more files that are scanned, the more resources are used up.

Figure 1:
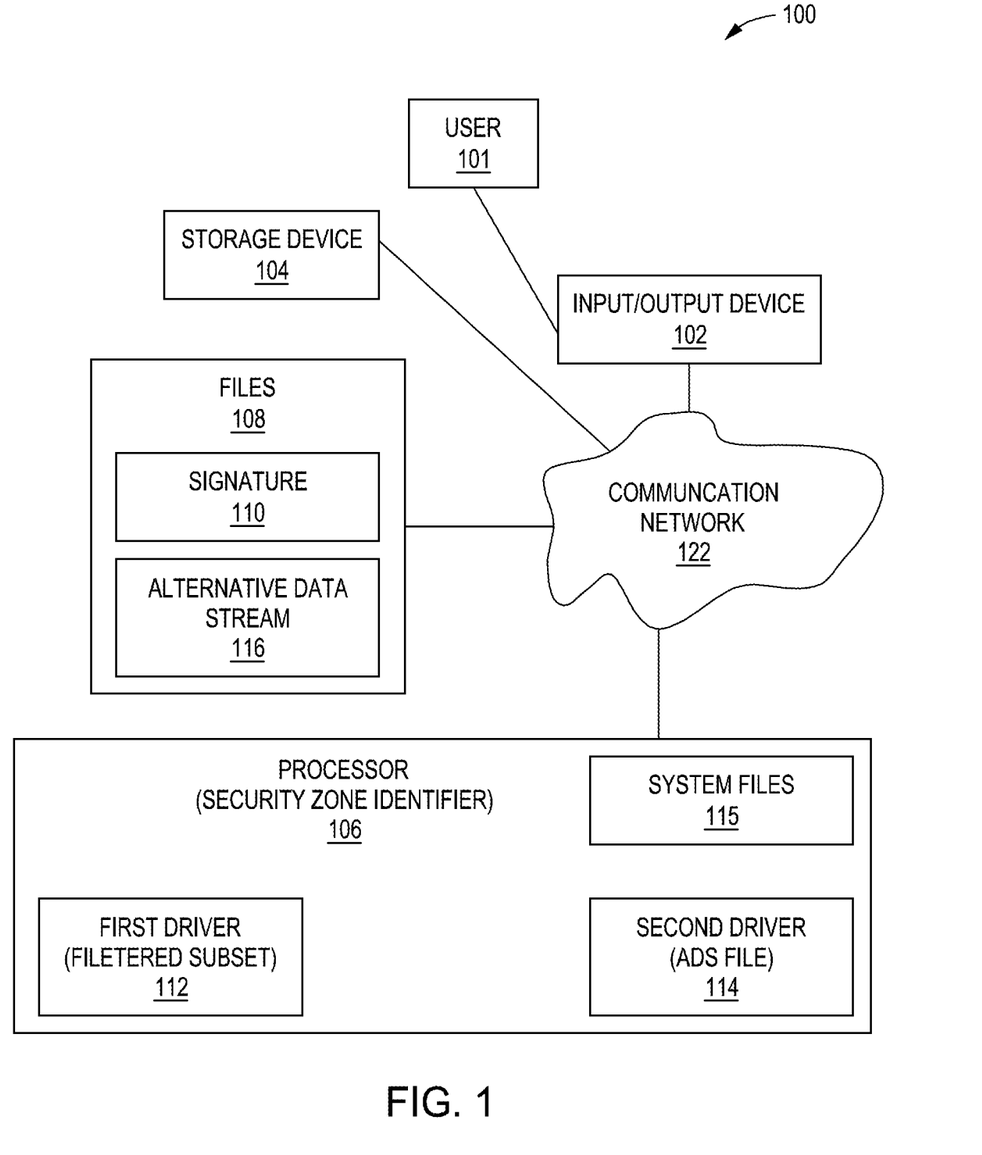
FIG. 1 depicts a high-level block diagram of a network architecture of a system for efficient security scanning of recently downloaded files from the Internet into a computer system in accordance with an embodiment of the present principles.

In some embodiments, system 100 is implemented via drivers that filter and scan only recently downloaded files 108 based on associated metadata (e.g., security zone identifier (.Zone.Identifier)). System 100 then checks the downloaded files 108 for malware and marks them with a signature 110 that they've been scanned, and the same files will need to be rechecked. System 100 hashes the checked file 108 and keeps the hash for future reference. Upon rescan of the files 108, system 100 is able to compare the hash values and detect whether the file has been changed, and if so, the system rechecks the file.

For example with reference to FIG. 1, in some embodiments, system 100 includes an input/output device 102, a storage device 104, and a processor 106 programmed to download one or more files 108 via the input/output device to the storage device. In some embodiments, the system 100 first filters, by a first driver 112, the one or more downloaded files 108 using associated metadata and/or Internet capabilities of the invoking process (e.g. security zone identifier associated with each of the one or more downloaded files) to produce a filtered subset of one or more files. The first driver then scans the filtered subset of one or more files for malware. The first driver 112 may be a native operating system driver or other type of generic malware scanner.

The system 100 then stores, by a second driver 114, a first set of information associated with each of the scanned files 108 to indicate that each of the filtered subset of one or more files have been scanned. In some embodiments, the first set of information is stored as metadata associated with a file. The metadata may be stored using an Alternate Data Stream or as part of general purpose data storage. Alternate data streams (ADS), also known as NTFS file streams, are part of every file, as well as directories (folders), in a Windows NTFS volume, or example. Files and folders are comprised of attributes one of which is $Data. The content normally associated with a file such as the text in a .txt file or the executable code in a .exe file is stored in the 'default' $Data attribute or 'stream'. The name string of this default attribute is empty (set to " ") thus it is often referred to as the "unnamed data stream". Any additional $Data steams must be named and are typically referred to as "alternate data streams". The ADS may contain metadata information, such as, for example, one or more of the following: data locating a specific file by author or title, a security zone identifier, an indication as to whether a filed has been scanned, the date of the last scan, the results of the last scan, a scan time, a file size, a cryptographic hash signature, and the like.

The system 100 then monitors, by the second driver, changes to existing files on the storage device 104 based on a comparison of the information associated with the existing file's metadata and the information stored within the associated file's metadata (e.g. stored in the ADS). Based on the changes found, the system 100 sends instructions to rescan any existing file which a change has been detected for malware, and updates the information associated with any rescanned file in the file's metadata (e.g. written using ADS).

In some embodiments, the security zone identifier identifies a file origin of where the one or more downloaded files 108 are downloaded from. In some embodiments, the security zone identifier is a Zone.Identifier including a numerical value that identifies a file origin as one of: 0 for Local Machine Zone, 1 for Local Intranet Zone, 2 for Trusted Sites Zone, 3 for Internet Zone, and 4 for Restricted Sites Zone.

In some embodiments, files 108 identified as having a security zone identifier that indicates the file is from an Internet zone are included in the filtered subset of files. In some embodiments, the first driver 112 is a native file system driver. In some embodiments, the second driver 114 is a custom file system monitoring application driver, also referred to as an M-Shield driver herein). In some embodiments, the first driver 112 further filters the one or more downloaded files 108 using a download timestamp to produce the filtered subset of files.

In some embodiments, only files 108 having a download timestamp less than a predefined threshold are scanned. In some embodiments, the predefined threshold is defined by all the files that are downloaded and not scanned from the time of the application started.

In some embodiments, the first set of information stored as metadata in an ADS associated with each of the scanned file includes one or more of a file name, an indication of whether the file was previously scanned, results of the last scan, a scan time, a file size, or a cryptographic hash signature 110 of the file 108.

In some embodiments, the system 100 prioritizes files 108 that are executable over any other file type for scanning and rescanning. In some embodiments, the alternative data stream file associated with each file 108 is produced on startup of the system 100. In some embodiments, the system 100 includes a scoring system to determine how often and if any of the files 108 need to be rechecked.

In some embodiments, the scoring system is based upon at least one of each file's 108 source, creation date, and directory. In some embodiments, the scoring system determines at least one type of scanning, type of checking method, and scanning priority. In some embodiments, each file 108 that was changed is rehashed and the rehash is stored for a later comparison.

Figure 8:
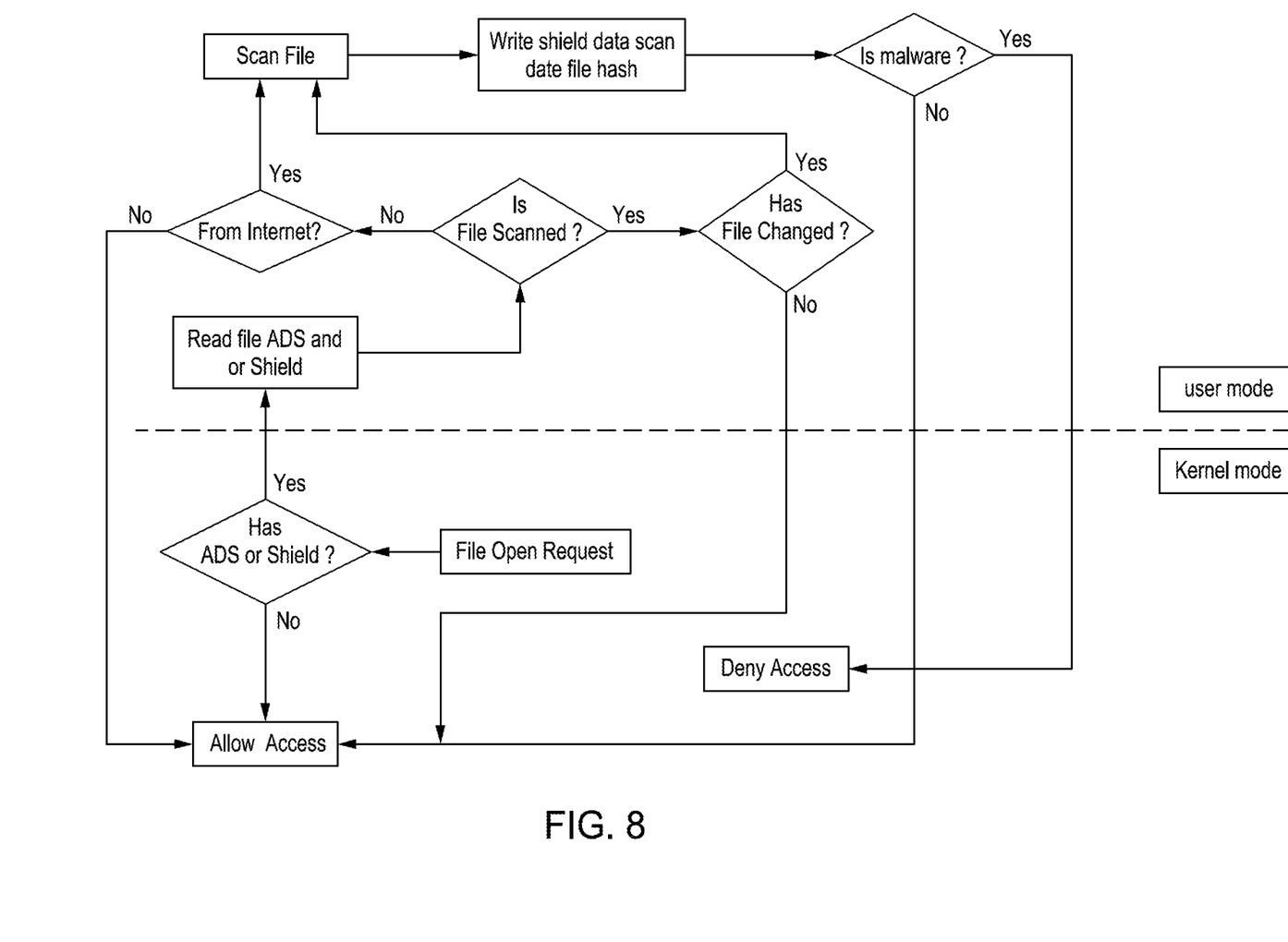

In some embodiments, the system 100 includes an input/output device 102 and a storage device 104. The system 100 also includes a processor 106 programmed to receive files 108 at the storage device 104 via the input/output device 102. With additional reference to FIG. 8, the processor 106 detects if any processes are trying to write to other files 115 on the system 100, and if so, checks if the detected file has been scanned before using file's metadata (e.g. written using ADS), if the detected file matches the alternative-stream database 116, the detected file is allowed and noted as clean, if the detected file fails to match the alternative-stream database 116, the detected file is scanned and marked as scanned until the detected file changes again. The processor 106 re-scans the detected file that changed again using the alternative-stream database 116, and if the detected file matches the alternative-stream database 116, the detected file is allowed and noted as clean, and if the detected file fails to match the alternative-stream database 116, the detected file that changed again is disabled. The processor 106 transmits the results of the rescan to the input/output device 102.

In some embodiments, the system 100 prioritizes files that are executable over any other file type. In some embodiments, the alternative-stream database 116 is produced on startup of the system 100. For instance, on startup the system 100 determines the state of each file on the system. So in this case, system 100 uses the hash to reconstruct our understanding of the system, of the files on the system.

Figure 6:
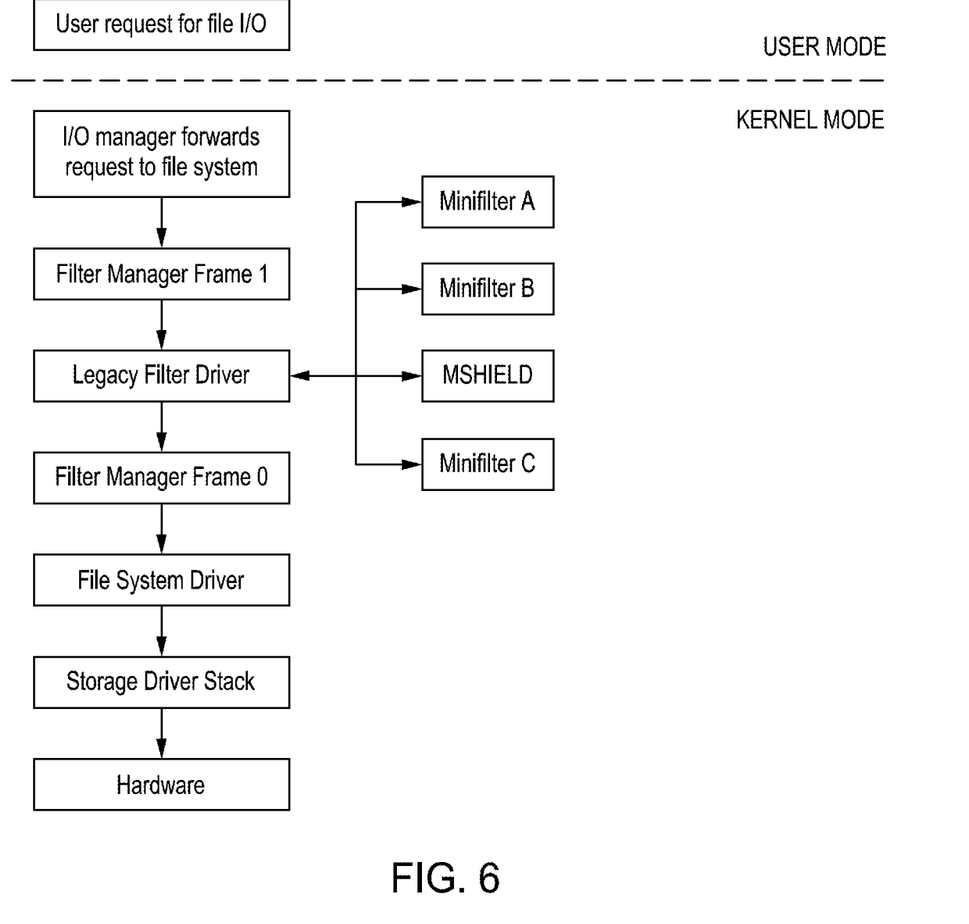
FIGS. 6-8 depict additional flow diagrams of a method for efficient security scanning of recently downloaded files from the Internet into a computer system, in accordance with an embodiment of the present principles.

More in particular and with reference to FIG. 6, in some embodiments, the second driver 114, e.g. MSHIELD, registers itself as a mini-filter in with the Microsoft filter manager of system 100. This registration on the Windows platform is an initial stage of driver 114 to enable the start accepting notifications about file(s) 108 activities on system 100. In other words, drive 114 is a Window's mini-filter driver that monitors file(s) 108 activities.

In some embodiments, the alternative-stream database 116 is generated by a determination of which files 108 were recently received based upon alternative-stream data carried by each respective file, using an alternative-stream data threshold that filters which files are considered, scanning the files that were filtered for malware, marking each of those files as scanned, generating a hash for each file that was scanned, storing each hash in the alternative-stream database, re-scanning each of the files that was scanned and comparing each file re-scanned with its respective stored hash to detect if any individual file was changed based upon this comparison, and any file that was detected to have changed is re-checked to assess the security risk the file presents to the system 100.

Figure 7:
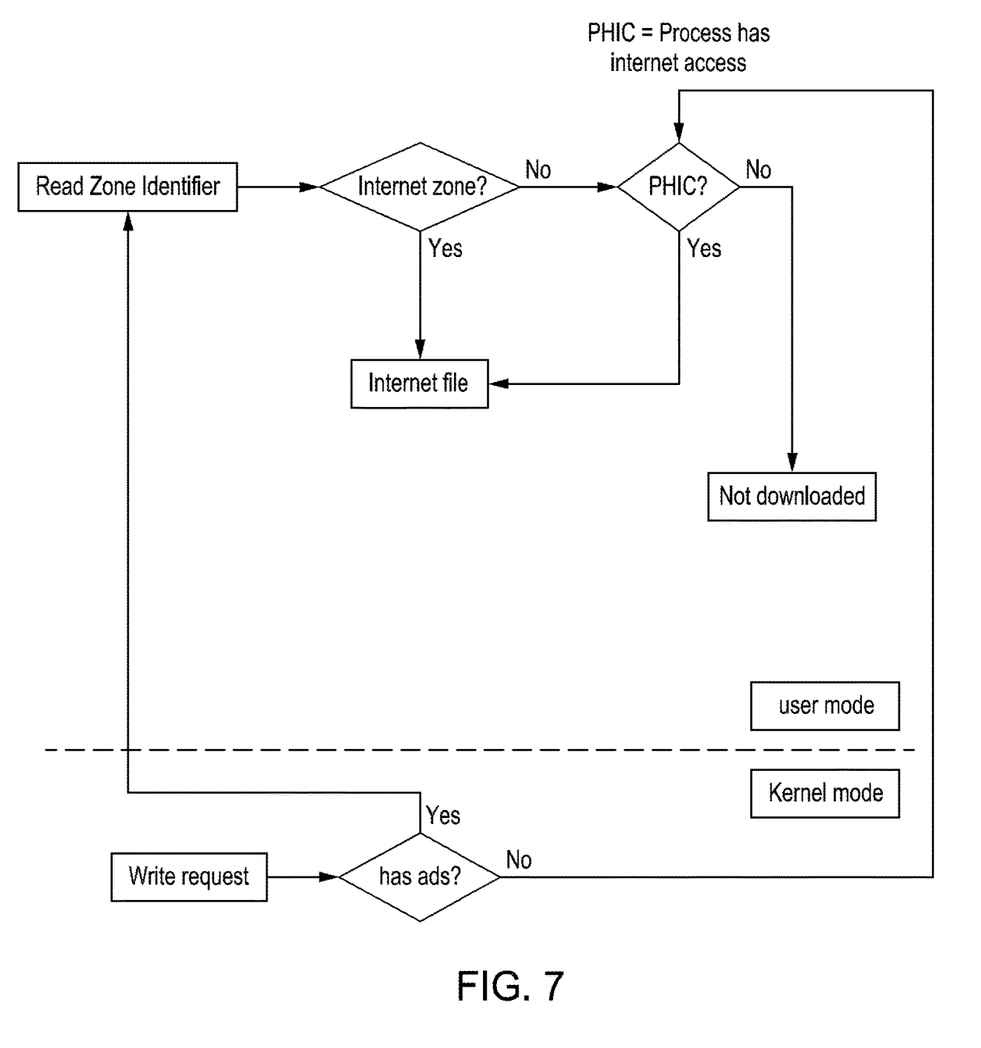

In some embodiments, the alternative-stream data uses Zone.Identifier for Microsoft based operation systems as well as using at least one of fanotify and inotify Application Programming Interfaces that enables system 100 to monitor filesystem events in Linux and Android. For instance and with reference to FIG. 7, the source of the file 108 is checked after a write request is made by system 100 and the second driver 114 determines if the write request has advertisements as an initial parameter. In some embodiments, the alternative-stream data uses Zone.Identifier for Microsoft based operation systems as well as using at least one of fanotify and inotify Application Programming Interfaces that enables system 100 to monitor filesystem events in Linux and Android. For instance and with reference to FIG. 7, the source of the file 108 is checked after a write request is made by system 100 and the second driver 114 determines if the write request has advertisements as an initial parameter. A fanotify notification group is a kernel-internal object that holds a list of files, directories, filesystems, and mounts for which events shall be created. Meanwhile, the inotify API provides a mechanism for monitoring filesystem events. Inotify can be used to monitor individual files, or to monitor directories.

In some embodiments, the system 100 includes a scoring system to determine how often and if any of the files 108 need to be rechecked. In some embodiments, the scoring system is based upon at least one of each file's 108 source, creation date, and directory. In some embodiments, the scoring system determines at least one type of scanning, type of checking method, and scanning priority. In some embodiments, each file 108 that was changed is rehashed and the rehash is stored for a later comparison.

In some embodiment, the system 100 communicates over a communications network 122, which enables a signal to travel anywhere within system 100 and/or to any other component/system connected to the system. The communications network 122 is wired and/or wireless, for example. The communications network 122 is local and/or global with respect to system 100, for instance.

Figure 2:
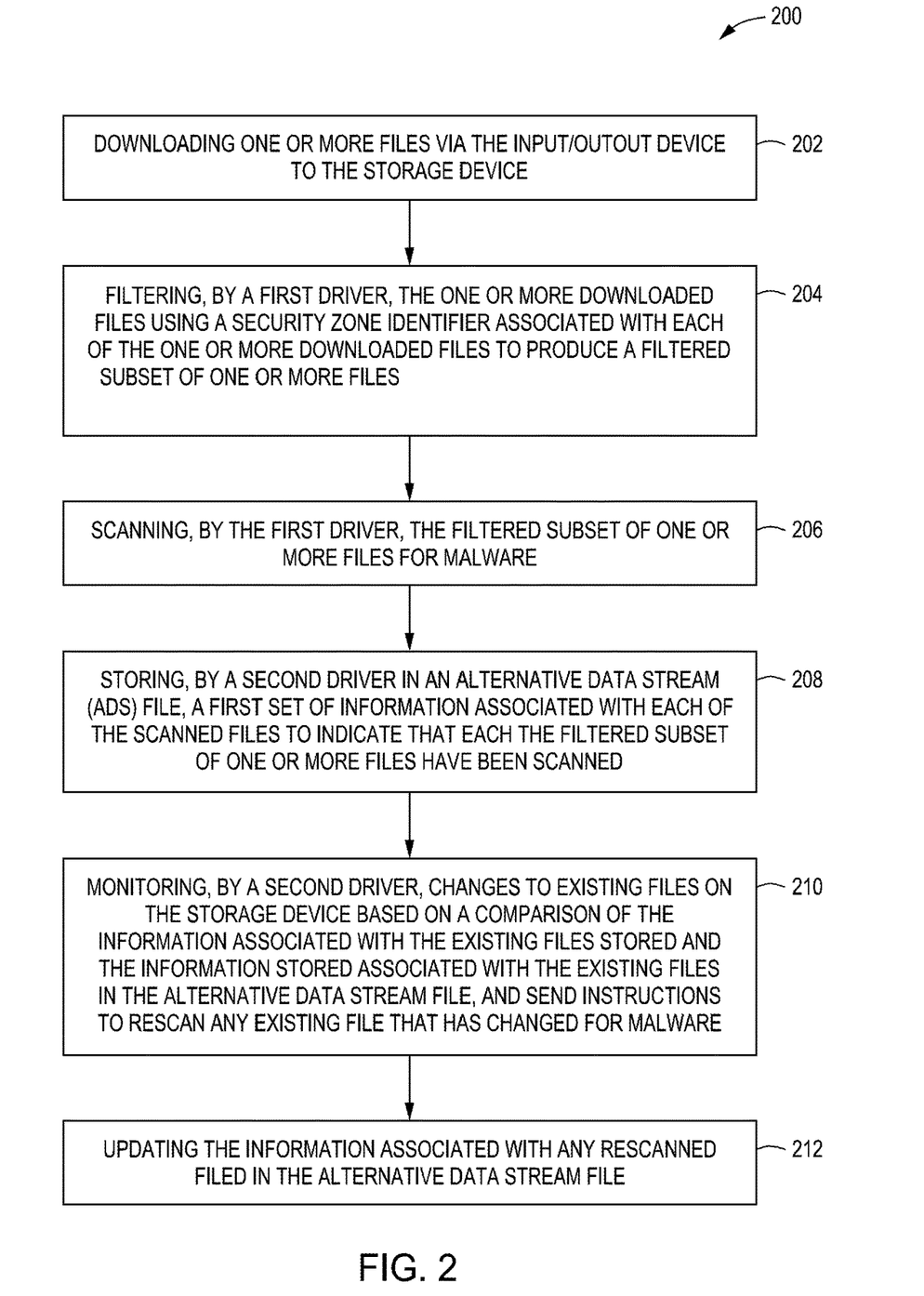
FIG. 2 depicts a flow diagram of a method for efficient security scanning of recently downloaded files from the Internet into a computer system, in accordance with an embodiment of the present principles.
Figure 3:
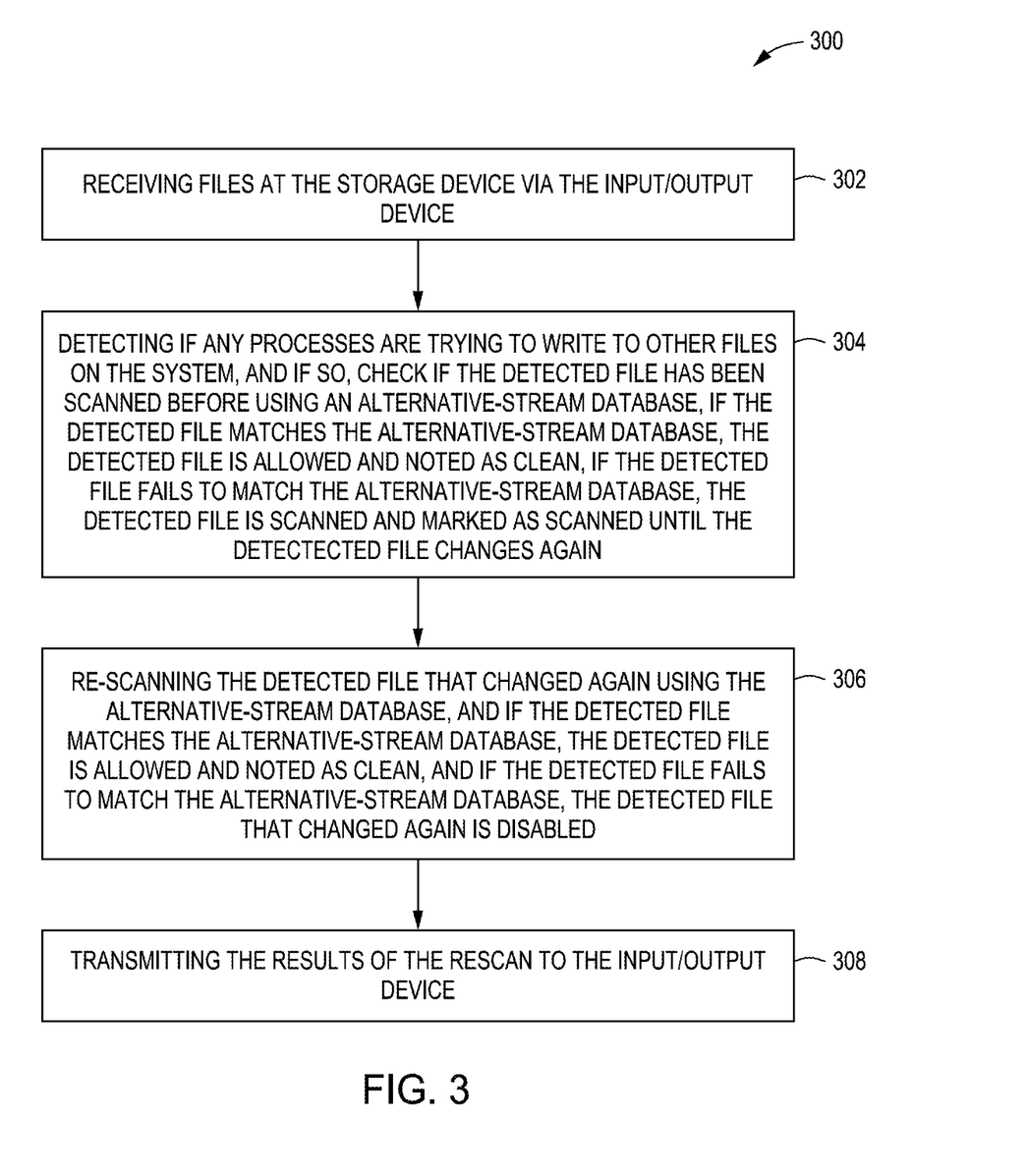
FIG. 3 depicts a flow diagram of a method for efficient security scanning of recently downloaded files from the Internet into a computer system, in accordance with an embodiment of the present principles.
Figure 4:
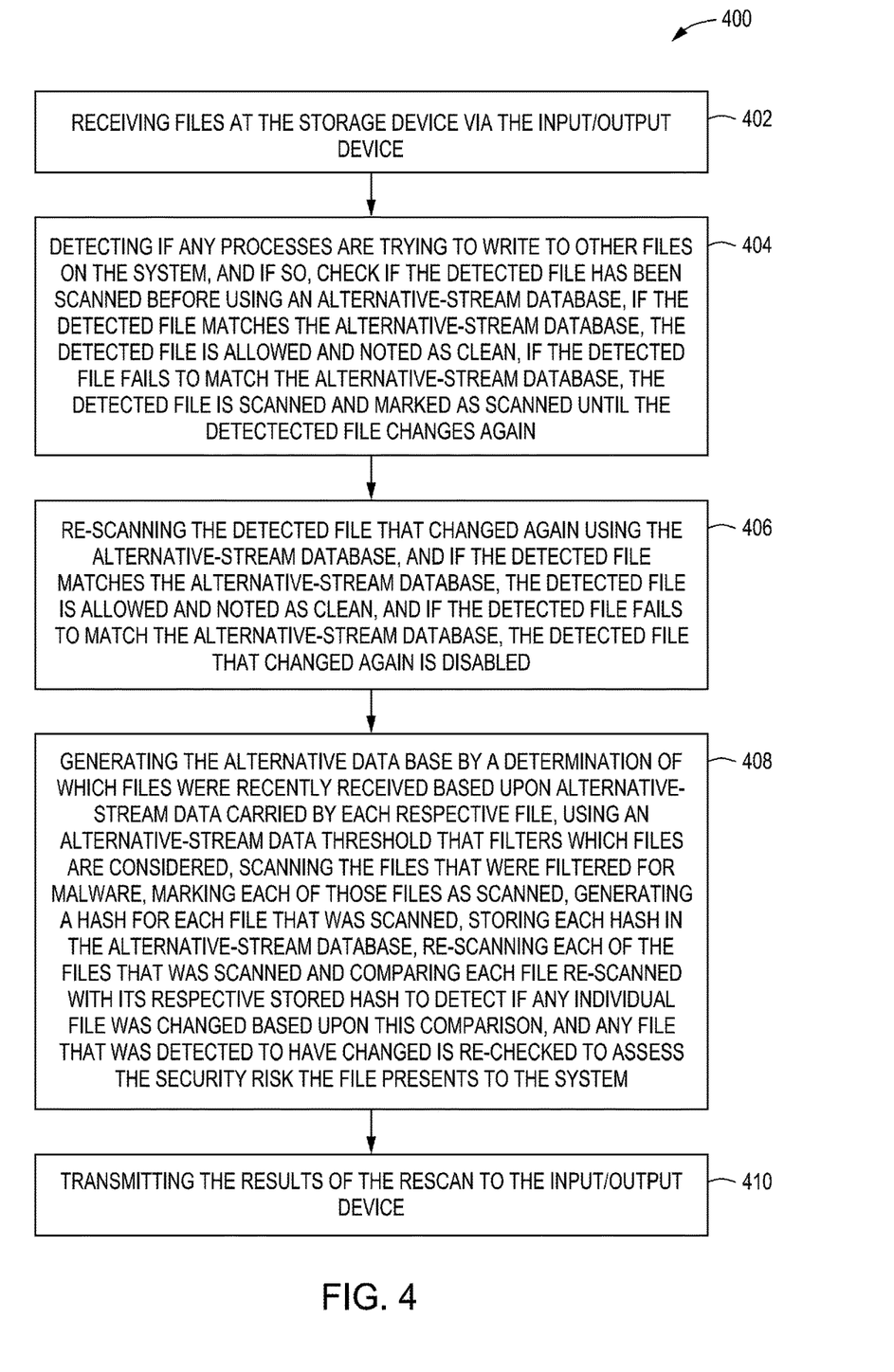
FIG. 4 depicts another flow diagram of a method for efficient security scanning of recently downloaded files from the Internet into a computer system, in accordance with an embodiment of the present principles.

FIGS. 2-4 illustrate example flow diagrams representing one or more of the processes as described herein. Each block of the flow diagram may represent a module of code to execute and/or combinations of hardware and/or software configured to perform one or more processes described herein. Though illustrated in a particular order, the following figures are not meant to be so limiting. Any number of blocks may proceed in any order (including being omitted) and/or substantially simultaneously (i.e., within technical tolerances of processors, etc.) to perform the operations described herein.

FIG. 2 is an example process 200 a flow diagram of a method for efficient security scanning of recently downloaded files from the Internet into a computer system, in accordance with an embodiment of the present principles. Such a process 200 may begin at 202 by downloading one or more files via the input/output device to the storage device. The method may also include filtering, by a first driver, the one or more downloaded files using a security zone identifier associated with each of the one or more downloaded files to produce a filtered subset of one or more files at 204. The method may additionally include scanning, by the first driver, the filtered subset of one or more files for malware at 206. The method also includes storing, by a second driver in the associated file's metadata (e.g. using ADS), a first set of information associated with each of the scanned files to indicate that each of the filtered subset of one or more files have been scanned at 208. The method further includes monitoring, by the second driver, changes to existing files on the storage device based on a comparison of the information associated with the existing files stored and the information stored associated with the existing files in the associated file's metadata (e.g. using ADS), and sends instructions to rescan any existing file that has changed for malware at 210. The method additionally includes updating the information associated with any rescanned file in the alternative data stream file at 212.

FIG. 3 depicts a flow diagram of another method 300 for efficient security scanning of recently downloaded files from the Internet into a computer system. The method begins at 302 by receiving files at the storage device via the input/output device. The method also includes detecting if any processes are trying to write to other files on the system, and if so, check if the detected file has been scanned before using an alternative-stream database, if the detected file matches the alternative-stream database, the detected file is allowed and noted as clean, if the detected file fails to match the alternative-stream database, the detected file is scanned and marked as scanned until the detected file changes again at 304. The method further includes re-scanning the detected file that changed again using the alternative-stream database, and if the detected file matches the alternative-stream database, the detected file is allowed and noted as clean, and if the detected file fails to match the alternative-stream database, the detected file that changed again is disabled at 306. The method additionally includes transmitting the results of the rescan to the input/output device at 308.

FIG. 4 depicts a flow diagram of another method 400 for efficient security scanning of recently downloaded files from the Internet into a computer system. The method begins at 402 by receiving files at the storage device via the input/output device. The method also includes detecting if any processes are trying to write to other files on the system, and if so, check if the detected file has been scanned before using an alternative-stream database, if the detected file matches the alternative-stream database, the detected file is allowed and noted as clean, if the detected file fails to match the alternative-stream database, the detected file is scanned and marked as scanned until the detected file changes again at 404. The method further includes re-scanning the detected file that changed again using the alternative-stream database, and if the detected file matches the alternative-stream database, the detected file is allowed and noted as clean, and if the detected file fails to match the alternative-stream database, the detected file that changed again is disabled at 406.

The method additionally includes generating the alternative data base by a determination of which files were recently received based upon alternative-stream data carried by each respective file, using an alternative-stream data threshold that filters which files are considered, scanning the files that were filtered for malware, marking each of those files as scanned, generating a hash for each file that was scanned, storing each hash in the alternative-stream database, re-scanning each of the files that was scanned and comparing each file re-scanned with its respective stored hash to detect if any individual file was changed based upon this comparison, and any file that was detected to have changed is re-checked to assess the security risk the file presents to the system at 408. The method also includes transmitting the results of the rescan to the input/output device at 410.

Figure 5:
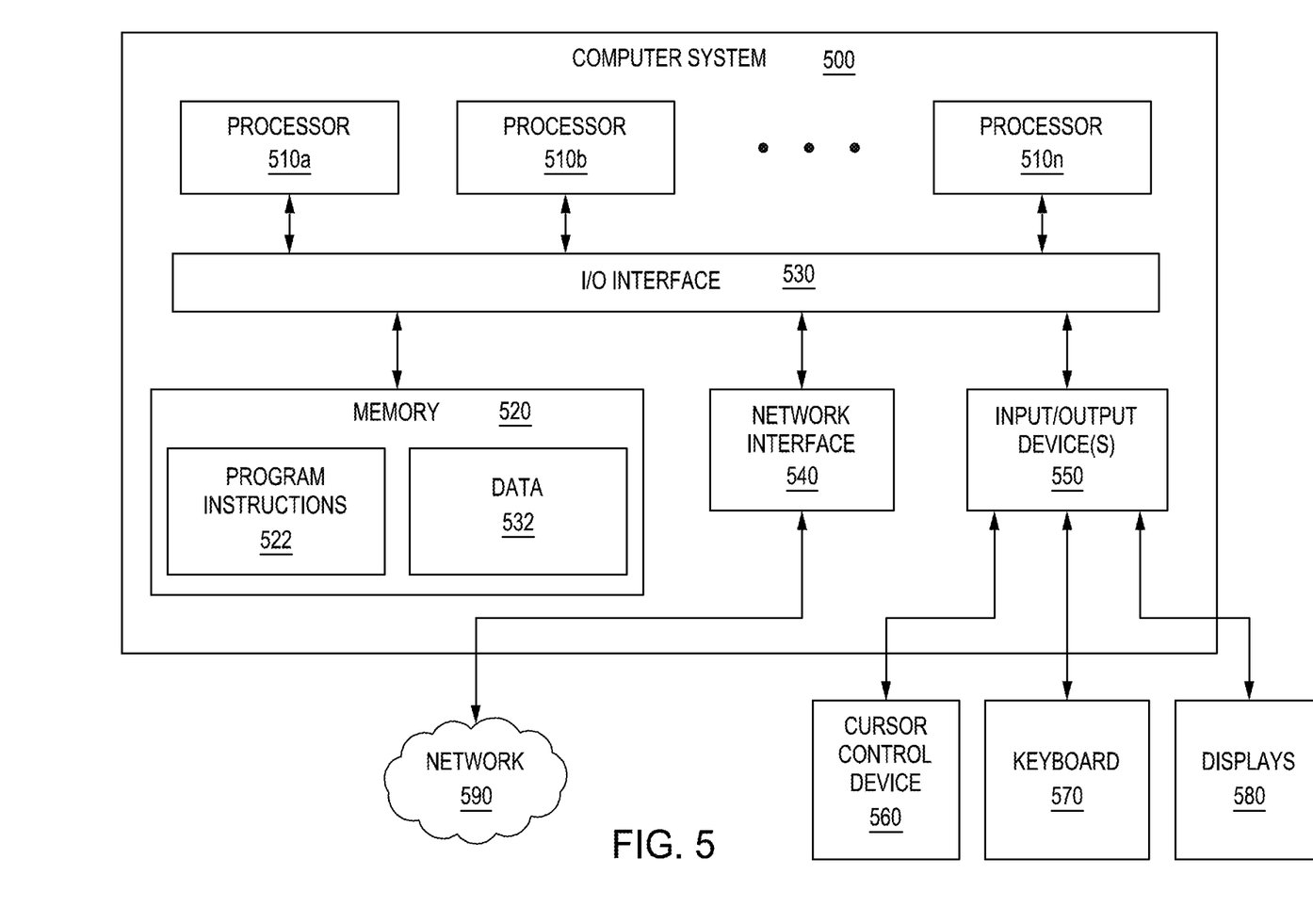
FIG. 5 depicts a high-level block diagram of a computing device suitable for use with embodiments for efficient security scanning of recently downloaded files from the Internet into a computer system in accordance with the present principles.

FIG. 5 depicts a computer system 500 that can be utilized in various embodiments of the invention to implement the computer and/or the display, according to one or more embodiments.

Various embodiments of method and system to identify security issues in downloaded files such as from the Internet, as described herein, may be executed on one or more computer systems, which may interact with various other devices. One such computer system is computer system 500 illustrated by FIG. 5, which may in various embodiments implement any of the elements or functionality illustrated in FIGS. 1-4. In various embodiments, computer system 500 may be configured to implement methods described above. The computer system 500 may be used to implement any other system, device, element, functionality or method of the above-described embodiments. In the illustrated embodiments, computer system 500 may be configured to implement the methods 200, 300 and 400 as processor-executable executable program instructions 522 (e.g., program instructions executable by processor(s) 510) in various embodiments.

In the illustrated embodiment, computer system 500 includes one or more processors 510*a*-510*n* coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In various embodiments, any of the components may be utilized by the system to receive user input described above. In various embodiments, a user interface may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs). In multiprocessor systems, each of processors 510 may commonly, but not necessarily, implement the same ISA.

System memory 520 may be configured to store program instructions 522 and/or data 532 accessible by processor 510. In various embodiments, system memory 520 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 590), such as one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via digital fiber communications networks; via storage area networks such as Fiber Channel SANs, or via any other suitable type of network and/or protocol.

Input/output devices 550 may, in some embodiments, include one or more display terminals, keyboards, keypads, touchpads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the operations and methods described above, such as the methods illustrated by the flowchart of FIGS. 2-4. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion and are not intended to imply that any specific implementation details are required. For example, any of the described modules and/or data structures may be combined or divided into sub-modules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

What is claimed is:

1. A security system comprising:
an input/output device;
a storage device;
a processor programmed to:
   download one or more files via the input/output device to the storage device;
   filter, by a first driver, the one or more downloaded files using a security zone identifier associated with each of the one or more downloaded files and a download timestamp to produce a filtered subset of one or more files;
   scan, by the first driver, the filtered subset of one or more files for malware;
   store, by a second driver, a first set of information associated with each of the scanned files to indicate that each of the filtered subset of one or more files have been scanned, wherein the first set of information is stored as metadata using alternative data stream (ADS) associated with each scanned file;
   monitor, by the second driver, changes to existing files on the storage device based on a comparison of the information associated with the existing files stored and the information stored using ADS associated with the existing files in the associated file's metadata, and send instructions to rescan any existing file that has changed for malware; and
   update the information associated with any rescanned file's metadata using the ADS.

2. The security system of claim 1, wherein the security zone identifier identifies a file origin of where the one or more downloaded files are downloaded from.

3. The security system of claim 2, wherein the security zone identifier is a Zone.Identifier including a numerical value that identifies a file origin as one of: 0—Local Machine Zone, 1—Local Intranet Zone, 2—Trusted Sites Zone, 3—Internet Zone, 4—Restricted Sites Zone.

4. The security system of claim 2, wherein only files identified as having a security zone identifier that indicates the file is from an Internet zone are included in the filtered subset of files.

5. The security system of claim 1, wherein the first driver is a native file system driver.

6. The security system of claim 1, wherein the second driver is a custom file system monitoring application driver.

7. The security system of claim 1, wherein only files having a download timestamp less than a predefined threshold are scanned.

8. The security system of claim 1, wherein the first set of information stored using ADS in the associated file's metadata associated with each of the files scanned includes one or more of a file name, an indication of whether the file was previously scanned, results of the last scan, a scan time, a file size, or a cryptographic hash signature of the file.

9. The security system of claim 1, wherein the system prioritizes files that are executable over any other file type for scanning and rescanning.

10. The security system of claim 1, wherein the alternative data stream associated with each file is produced on startup of the system.

11. The security system of claim 1, wherein the system includes a scoring system to determine how often and if any of the files need to be rescanned.

12. The security system of claim 11, wherein the scoring system is based upon at least one of each file's source, creation date, and directory.

13. The security system of claim 11, wherein the scoring system determines at least one type of scanning, type of checking method, and scanning priority.

14. The security system of claim 1, wherein each file that was changed is rehashed and the rehash is stored for a later comparison.

15. A security system comprising:
an input/output device;
a storage device;
a processor programmed to:
   receive one or more downloaded files at the storage device via the input/output device;
   filtering, by a first driver, the one or more files downloaded to the storage device using a security zone identifier associated with each of the one or more downloaded files and a download timestamp to produce a filtered subset of one or more files;
   scan, by the first driver, the filtered subset of one or more files for malware;
   store, by a second driver, a first set of information associated with each of the scanned files to indicate that each of the filtered subset of one or more files have been scanned, wherein the first set of information is stored as metadata using alternative data stream (ADS) associated with each scanned file;
   monitor, by the second driver, a file system on the storage device and to detect one or more of the scanned files that have been changed or written to on the file system;
   determine if the one or more detected file have been scanned before using information stored in an alternative data stream database associated with the one or more detected file; and
   if information associated with the one or more detected files matches information stored in the alternative data stream database, the detected file is allowed and noted as clean, otherwise, if the information associated with the one or more detected files fails to match information stored in the alternative data stream database, the detected file is scanned and marked as scanned until the detected file changes again.

16. The security system of claim 15, wherein the processor is further programmed to:
re-scan the one or more detected files that changed again using the alternative data stream database, and if the detected file matches the alternative data stream database, the detected file is allowed and noted as clean, and if the detected file fails to match the alternative-stream database, the detected file that changed again is disabled; and
transmit the results of the rescan to the input/output device.

17. The security system of claim 15, wherein the alternative data stream database is produced on startup of the system.

18. The security system of claim 15, wherein the alternative data stream database is generated by a determination of which files were received within a predefined threshold based upon alternative-stream data carried by each respective file, using an alternative-stream data threshold that filters which files are considered, scanning the files that were filtered for malware, marking each of those files as scanned, generating a hash for each file that was scanned, storing each hash in the alternative-stream database, re-scanning each of the files that was scanned and comparing each file re-scanned with its respective stored hash to detect if any individual file was changed based upon this comparison, and any file that was detected to have changed is re-checked to assess the security risk the file presents to the system.

19. The security system of claim 15, wherein the alternative-stream data uses at least one of Zone.Identifier, fanotify and inotify.

20. A method for scanning downloaded files for malware, comprising:
- filtering, by a first driver, one or more downloaded files using a security zone identifier associated with each of the one or more downloaded files and a download timestamp to produce a filtered subset of one or more files;
- scanning, by the first driver, the filtered subset of one or more files for malware; store, by a second driver, a first set of information associated with each of the scanned files to indicate that each of the filtered subset of one or more files have been scanned, wherein the first set of information is stored as metadata using alternative data stream (ADS) associated with each scanned file;
- monitoring, by the second driver, changes to existing files on the storage device based on a comparison of the information associated with the existing files stored and the information stored using ADS associated with the existing files in the associated file's metadata, and send instructions to rescan any existing file that has changed for malware; and
- updating the information associated with any rescanned file's metadata using the ADS.

* * * * *